Figures 1, 2:
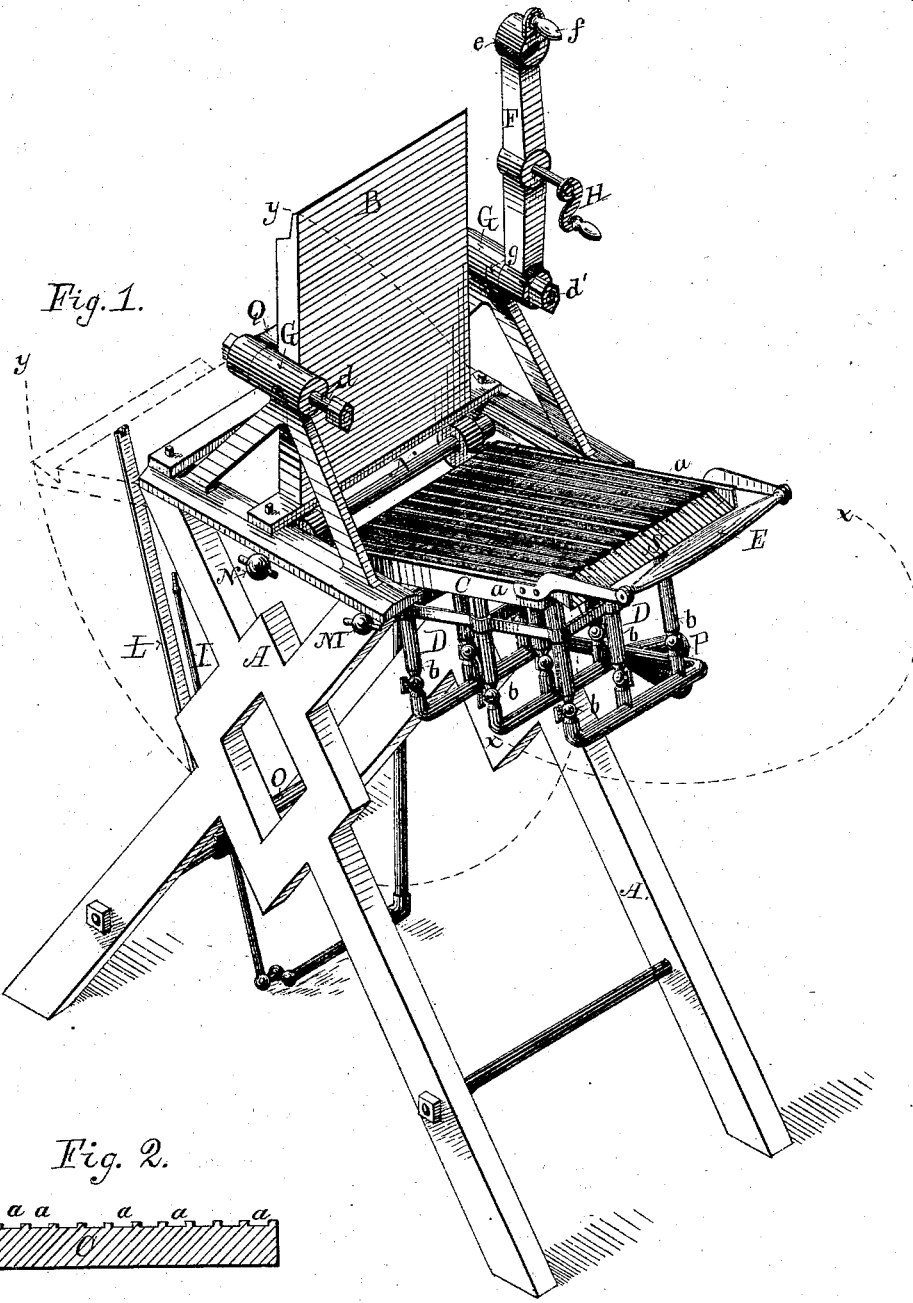

(No Model.) 2 Sheets—Sheet 1.

L. B. BENTON.
MOLD FOR CASTING PRINTERS' LEADS.

No. 254,792. Patented Mar. 14, 1882.

Witnesses:
Chas. L. Goss.
Fordyce H. Bothun

Inventor
L. B. Benton
per O. H. Bothun
Attorney.

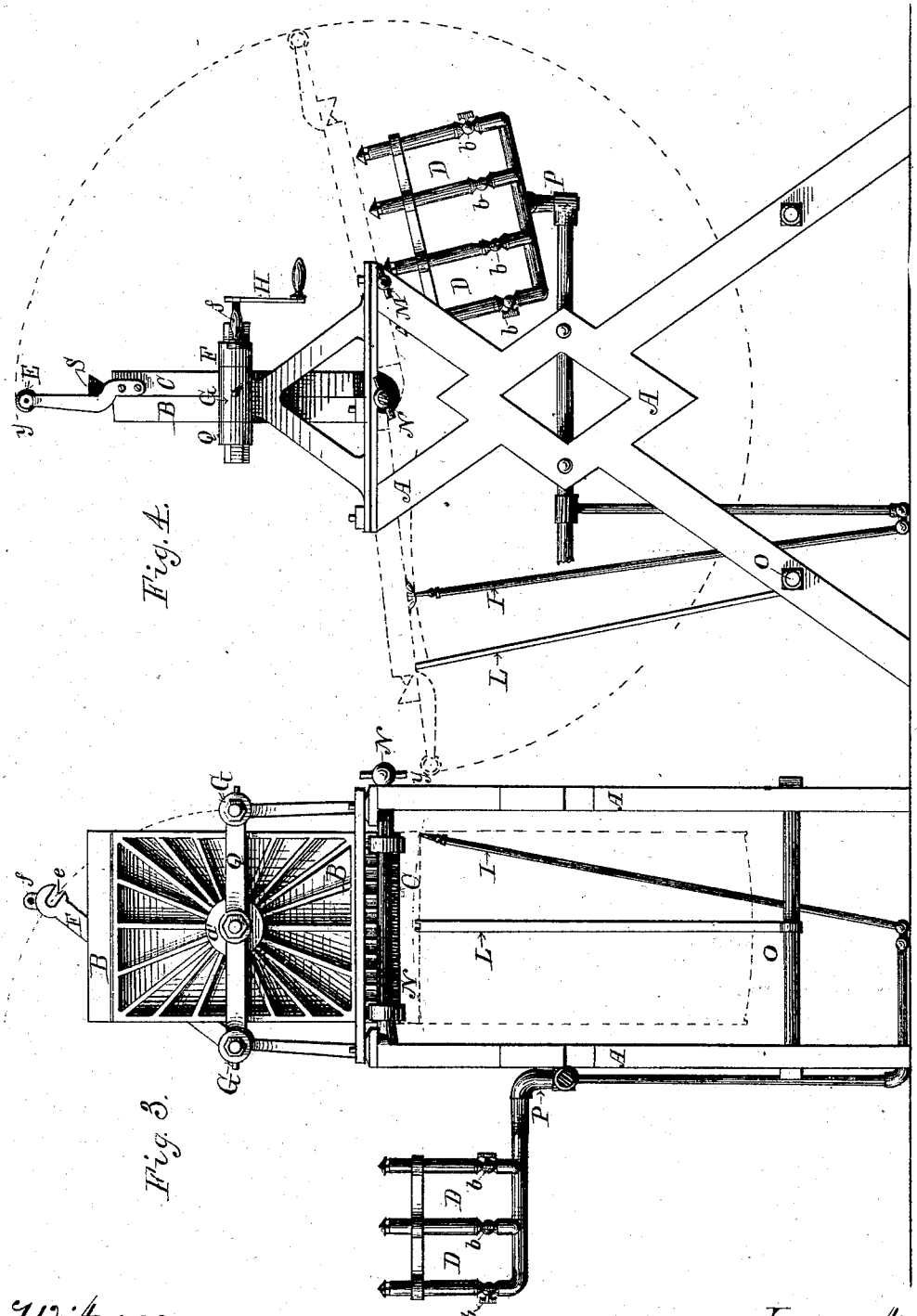

UNITED STATES PATENT OFFICE.

LINN BOYD BENTON, OF MILWAUKEE, WISCONSIN.

MOLD FOR CASTING PRINTERS' LEADS.

SPECIFICATION forming part of Letters Patent No. 254,792, dated March 14, 1882.

Application filed January 9, 1882. (No model.)

*To all whom it may concern:*

Be it known that I, LINN BOYD BENTON, of Milwaukee, in the county of Milwaukee and State of Wisconsin, have invented certain new and useful Improvements in Molds for Casting Printers' Leads; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates to molds for casting printers' leads; and it consists in a novel construction of the parts of the mold and their combination with each other and with various other parts which serve to keep the mold properly heated and facilitate the operation of casting.

In the accompanying drawings, like letters are used to denote similar parts, and in the same, Figure 1 is a perspective view of my complete mold. Fig. 2 is a horizontal cross-section of one half of the mold, which is marked C in Fig. 1. Fig. 3 is a rear elevation of my improved mold. Fig. 4 is a side elevation of the same.

A represents the frame-work of my mold, formed of cast-iron or other suitable material.

B is one half of the mold proper or back plate, attached to the frame-work A in an upright position, as shown in Fig. 1, and preferably cast with radiating projecting brace-bars attached thereto, as shown in Fig. 3, in order to secure stiffness and solidity. It is supported from behind by the bar Q, which crosses it horizontally near its center, and to which it is attached at its center by means of the tap-bolt a'. The bar Q is at its two extremities firmly secured to the two supports G G, which form part of the frame A, by means of two bolts, d d', which have their front ends threaded and provided with nuts. The bolts d d' project from the supports G G in front far enough to allow a hold for the bar F. C is the other half of the mold proper. It is provided with two downwardly-projecting ears, which are suitably curved to allow them to so hinge themselves upon the rod N, which passes through the frame from side to side, and also passes through the ears, as to permit the part C to be swung up in front of, in contact with, and parallel to the part B, and also permit it to be swung downward and backward, so that its inner face is horizontal and looks downward, as shown in the dotted lines in Figs. 1 and 4. In the latter position it may be held by the supporting brace-rod L, which is attached to the frame by a pivot-joint at its lower end, (marked O.)

The part C is braced at its back in the same way as the part B—that is, the part C is formed with projecting ribs at its back, which radiate from the intersection of two diagonal lines drawn through its corners and extend to its outer edges. These ribs are cast with the part C, and are made thick at the center and taper toward the edges in the manner often employed in the manufacture of platens for hand-presses to stiffen them.

I cover the face of the segment or back plate, B, with cartridge-paper, as this affords one of the best materials for lining a mold of this kind, being smooth and a good non-conductor of heat. Any other substance possessing these properties will answer, but I have always used and employed cartridge-paper by preference.

The front half of the mold proper, C, is provided with shallow rectangular perpendicular grooves $a\ a\ a$, which are closed at the bottom, except that small air-holes are left there to permit the outflow of air as the metal flows in, and these are shaped and made of a size so that each one will serve as a single mold for a printer's lead. The upper part of the mold-segment C is beveled off at S, as shown, to form a mouth or receptacle for the melted metal. When the segment C is swung up against the other segment B the bar F may be swung down into a horizontal position, the notch e catching upon the bolt d, and the two segments can be closely clamped together by means of the hand-screw H, which pierces the center of the bar F. The reverse end of the bar F is pivoted for this purpose on bolt d', and a handle, f, serves to move it conveniently. When in this position the melted metal is poured in at S, and as many leads are formed at one operation as there are grooves $a\ a\ a$ in the segment C. In order to properly smoke the mold-segment C, a gas-jet or torch-holder, I, is provided, which is properly pivoted at its lower end, where it is connected with the gas-pipe, and can be moved in any direction, so as to smoke the entire surface of segment C when swung backward for that purpose.

A horizontal bar, M, extending from end to end of the frame-work, serves as a support to the segment C when let down.

In order to cause the metal to flow easily into the interstices of the mold, it is desirable to maintain a certain degree of heat in the segments B and C, which is easily found by practice; and to do this I employ a set of small Bunsen burners, D D, to the number of a dozen, (more or less,) which are connected with a gas-pipe, P, that is so jointed to the gas-supply pipe that the system of burners can be swung underneath the segment C, or any part thereof, when the same is let down upon the supporting-bar M, or it can be swung out of the way at one side, as shown in Fig. 3.

Any of the well-known compositions for coating the interior of the mold in common use can be used, when desired.

Each of the burners D D is pivoted with a stop-key, b b. In this way the segment C can be heated upon a portion of its surface only, so as to do perfect work and fit closely and properly to its mate.

E is a handle which enables the operator to handle the mold-segment C readily.

The bar M is so constructed as to pull out of the way and permit the swinging of the mold-segment C unobstructedly upon its pivot N, whenever desired.

I have found in practice that the segments B and C will expand unevenly or curl when heated, and in making the same, in order to render the machine capable of rapid and accurate work, I find it necessary to gage it when heated to the same temperature at which it will be when in use, and hence so shape it that it will be concave when cold on its inner face and perfectly plane or level when in use.

The proper configuration, when once determined for a given size, pattern, and quality of iron used in the segment, can be determined thereafter by mechanical measurement in the manufacture of other similar molds; but from the nature of the case no absolute dimensions or measurements can be given.

As the back plate, B, is covered with the cartridge-paper, it does not need to be concaved or hollowed nearly as much as the segment C, since it does not become so hot.

I claim in a mold for casting printers' leads—

1. The mold-segment C, having a concave shape when cold, whereby it becomes plane when heated in use, substantially as and for the purposes set forth.

2. The combination of mold-segments B and C, constructed and operating as described, with the heaters D D, substantially as and for the purposes set forth.

3. The combination of the mold-segments B and C, constructed and operating as described, with the heaters D D, and the jointed smoking-jet or torch I, substantially as and for the purposes set forth.

4. In combination with a mold for casting printers' leads, a heater composed of separate burners D D D, constructed so as to be capable of being extinguished separately and arranged in such position relatively, to each other and to the mold as to permit the heating of a portion only of the mold-segment whenever desired, substantially as and for the purposes set forth.

In testimony that I claim the foregoing as my own I affix my signature in presence of two witnesses.

LINN BOYD BENTON.

Witnesses:
  CHAS. L. GOSS,
  E. H. BOTTUM.